United States Patent [19]
Schad et al.

[11] Patent Number: 5,750,162
[45] Date of Patent: *May 12, 1998

[54] TURRET ARTICLE MOLDING MACHINE INCLUDING BLOW MOLDING STATION

[75] Inventors: Robert Schad, Toronto; Robin Arnott, Alliston, both of Canada

[73] Assignee: Husky Injection Molding Systems Ltd., Canada

[*] Notice: The term of this patent shall not extend beyond the expiration date of Pat. No. 5,728,409.

[21] Appl. No.: 718,788

[22] Filed: Sep. 24, 1996

Related U.S. Application Data

[63] Continuation-in-part of Ser. No. 611,362, Mar. 6, 1996.
[51] Int. Cl.⁶ .................................................. B29C 49/06
[52] U.S. Cl. ........................ 425/533; 429/576; 429/589
[58] Field of Search ........................ 425/533, 130, 425/576, 589

[56] References Cited

U.S. PATENT DOCUMENTS 3,224,043  12/1965  Lameris et al. .
3,782,874  1/1974  Hehl .
4,836,767  6/1989  Schad et al. ........................ 425/576
5,028,226  7/1991  De'ath et al. .
5,032,077  7/1991  Farrell ........................ 425/533
5,066,217  11/1991  Fukuzawa et al. .
5,192,557  3/1993  Hirata et al. .
5,374,178  12/1994  Nakayama et al. ........................ 425/130

FOREIGN PATENT DOCUMENTS 61-49808  3/1986  Japan .

Primary Examiner—Tim Heitbrink
Attorney, Agent, or Firm—Bachman & LaPointe, P.C.

[57] ABSTRACT

An injection molding machine of the present invention includes a first mold half having one of at least one mold cavity and at least one mold core and a rotatable turret block rotatable on an axis for rotating a plurality of movable mold halves thereof into alignment with the first mold half. Each of the movable mold halves include one of at least one mold cavity and at least one mold core matable with the first mold half for forming a mold for molding a molded article. The rotatable turret block is further for clamping the movable mold halves and the first mold half together. The machine further includes a mechanism for moving the rotatable turret block relative the first mold half a first injector for injecting melt into the at least one mold cavity.

7 Claims, 13 Drawing Sheets

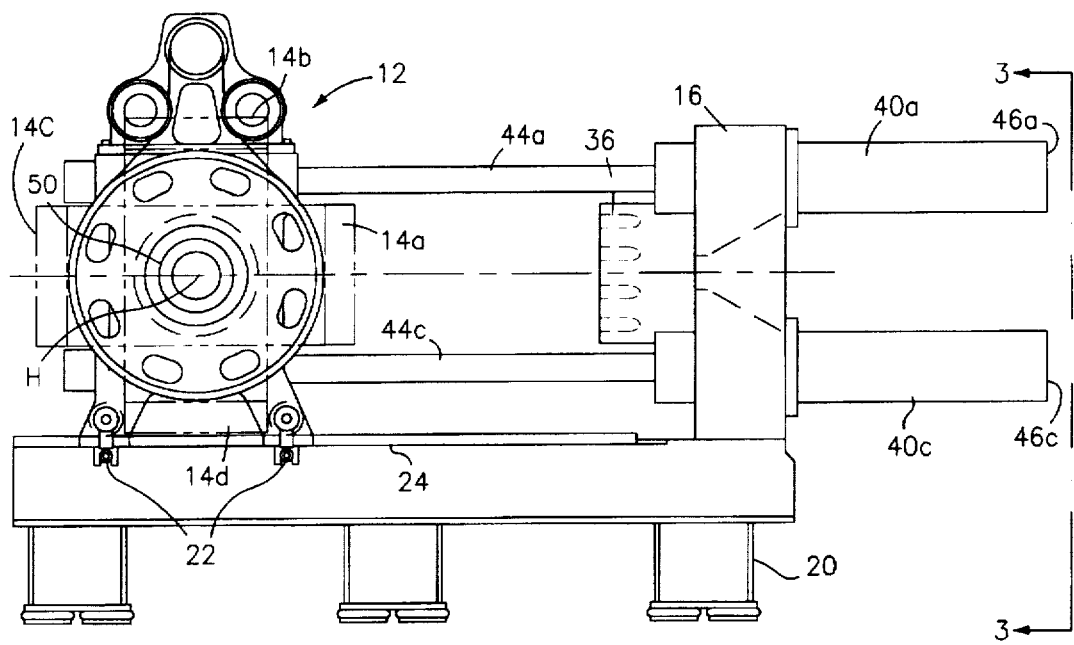
FIG. 2
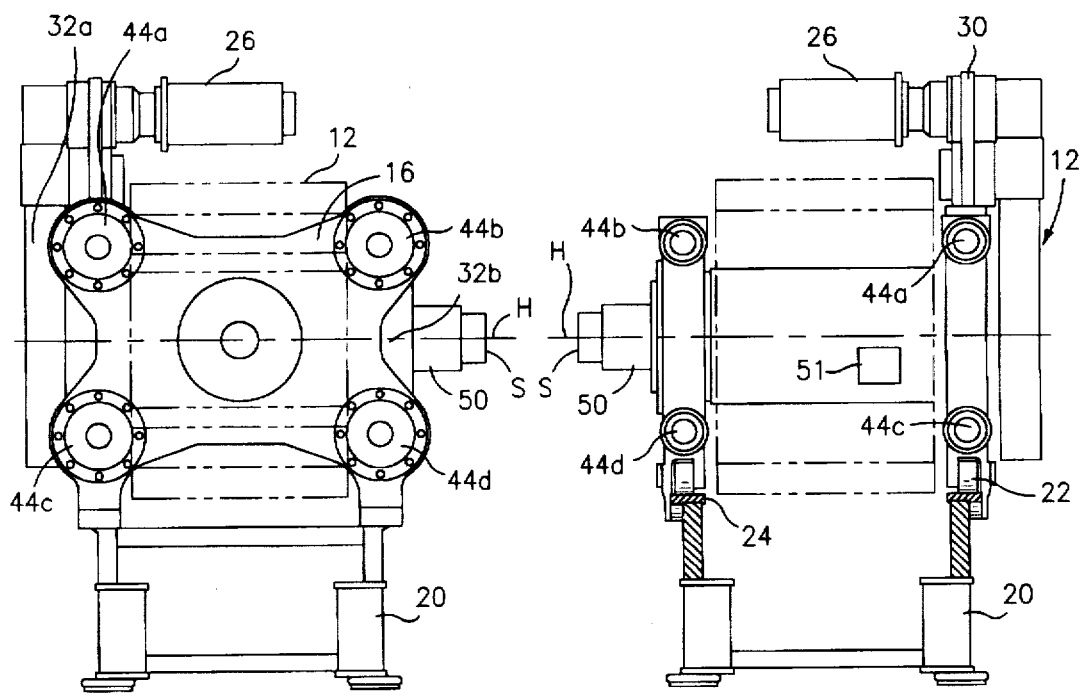
FIG. 3
FIG. 4

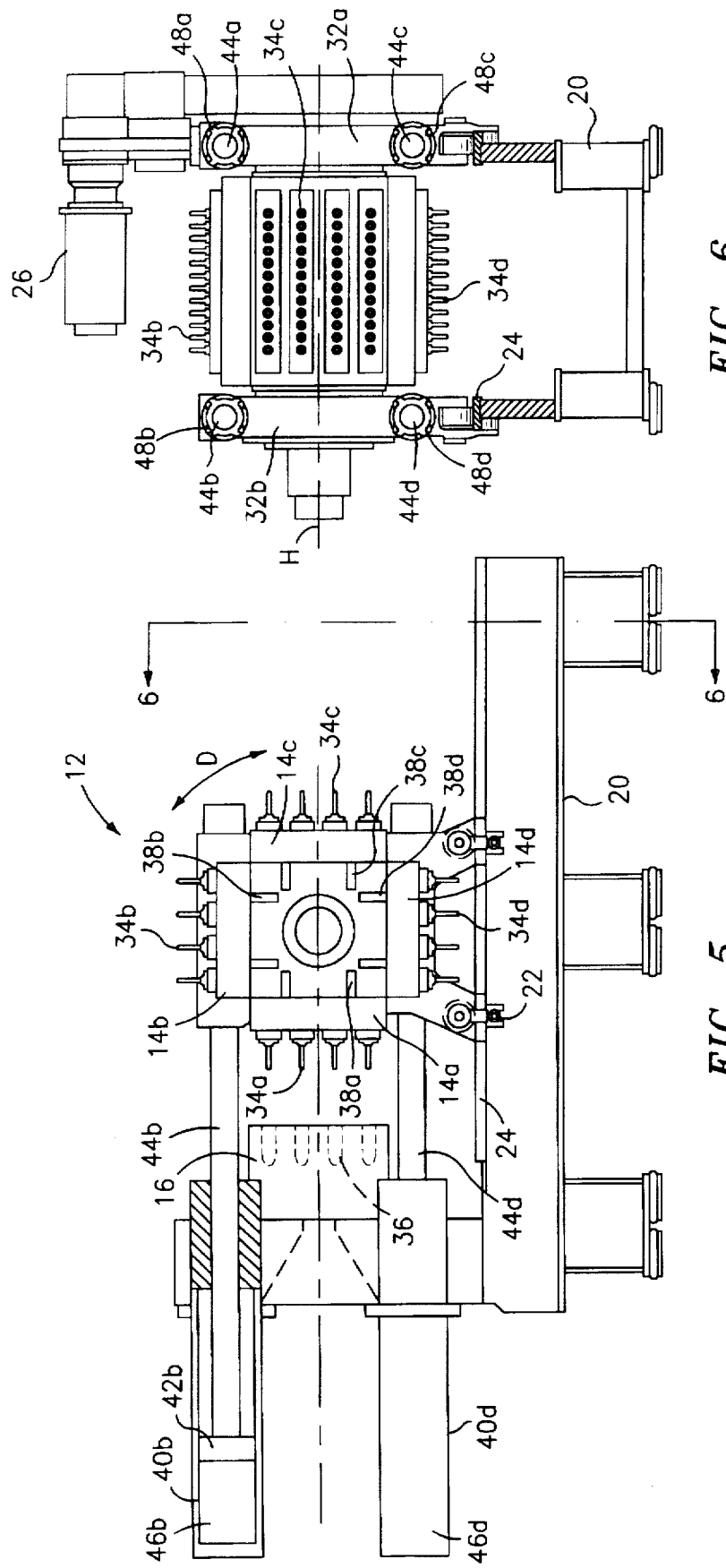

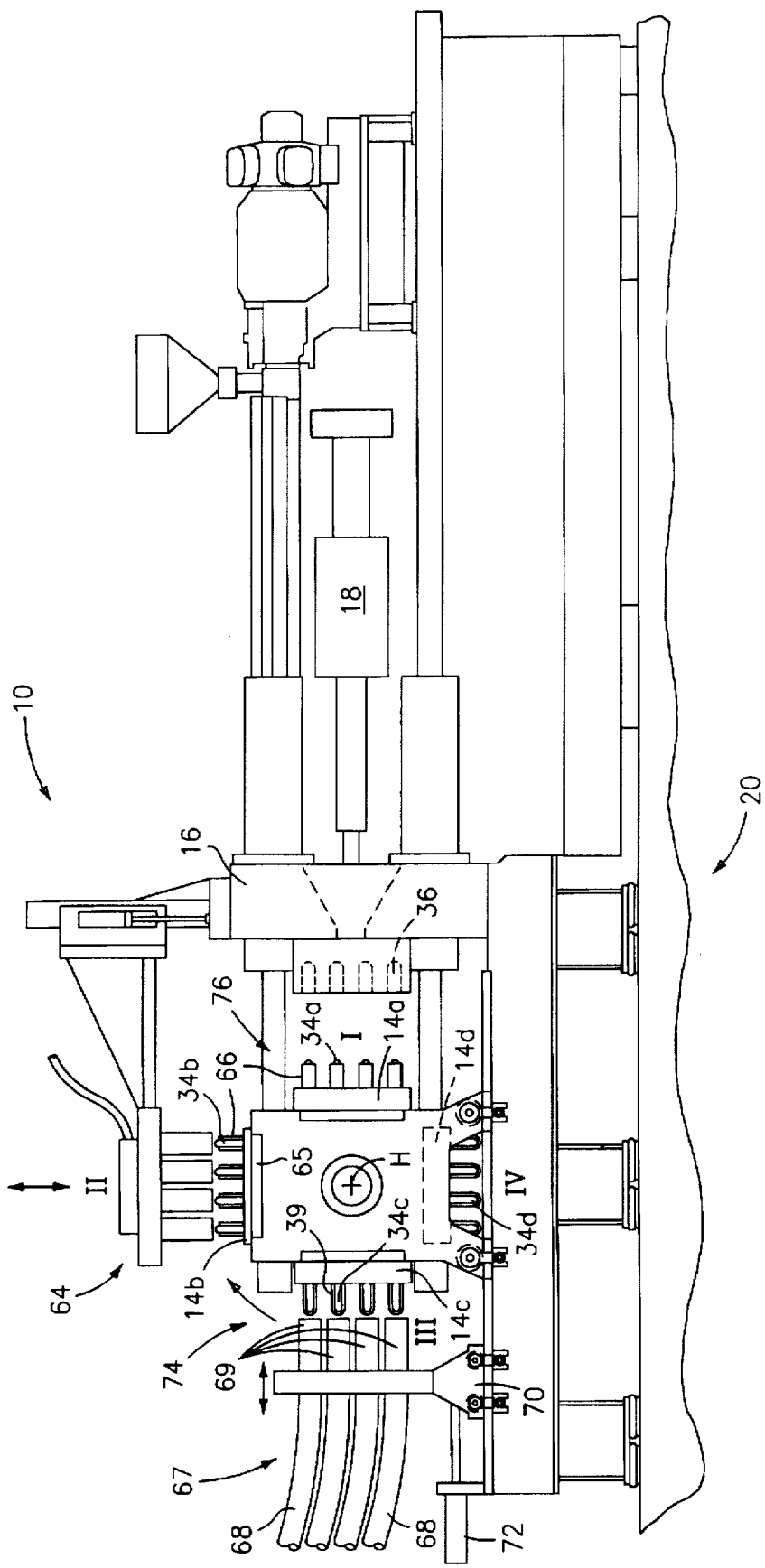

TURRET ARTICLE MOLDING MACHINE INCLUDING BLOW MOLDING STATION

CROSS-REFERENCE TO RELATED APPLICATION

This application is a Continuation-In-Part of copending application Ser. No. 08/611,362 for TURRET ARTICLE MOLDING MACHINE, By Schad et al., filed Mar. 6, 1996.

BACKGROUND OF THE INVENTION

This invention is directed to a turret style injection molding machine, and more particularly, to an injection molding machine having a rotating and longitudinally movable turret block with a plurality of mold halves rotatable and movable into engagement with a non-rotatable mold half, which machine also includes at least one station for providing additional molding related operations.

Injection molding machines having turret configurations for moving mold halves into and out of alignment with other mold halves are well known in the prior art. A turret type configuration for injection molding is beneficial since it lends itself to high volume production of molded parts. This is true since different molding related operations can be performed using the turret configuration, simultaneous to the actual molding of the part. That is, while one part is being molded on the turret block, another part having already been molded or to be molded can be subjected to a plurality of post molding or pre-molding operations. These operations include, for example, injecting, holding, cooling and ejecting, each of which can be performed at a different angular position relative the turret block.

The following patents disclose turret style injection molding machines wherein the turret has a vertical axis of rotation.

U.S. Pat. No. 4,734,023 to Nesch et al. discloses an injection molding machine which uses a four to eight sided turret block that rotates about a vertical axis and which is mounted between the stationary and moving platens of the machine. The turret is also slidable on lower tie bars between the platens.

U.S. Pat. No. 4,427,359 to Fukuoka discloses an injection stretch blow molding machine. The machine incorporates a four sided turret block positioned on a vertical axis wherein preforms are injection molded in a first position of the four sided turret block. Preforms are temperature conditioned inside a second conditioning mold at a second position of the block. The preforms are blow molded at a third position and ejected at a fourth.

U.S. Pat. No. 4,449,913 to Krishnakumar discloses a rotary injection turret for use in making preforms. The patent teaches a turret block rotatable on a vertical axis, which block uses two of the turret block positions for post mold treatment of preforms while the preforms are still on mold cores. Accordingly, after injection, hold and some cooling at a first station, the turret block rotates to a second position where cooling fluid is blown onto the exterior surface of the preforms in order to cool the preforms. At a third position, the preforms are inserted into a conditioning mold from the turret block where the gate vestige is trimmed and further temperature conditioning is performed.

Additional patents which disclose vertical axis turrets are U.S. Pat. Nos. 4,444,711 to Rees; U.S. Pat. No. 4,330,257 to Rees; U.S. Pat. No. 4,363,619 to Farrell; U.S. Pat. No. 3,833,329 to Ulmachneider; and U.S. Pat. No. 2,333,056 to Thoreson.

The following patents disclose injection molding machines using rotary turret block each of which have a horizontal axis of rotation.

U.S. Pat. No. 4,836,767 to Schad et al. discloses a swing plate molding machine. The swing plate molding machine includes two core mold halves and one single cavity mold half. During molding, parts are caused to remain on the cores of the mold halves and are swung to an outboard position where the parts are transferred into a four sided turret block arrangement for continued cooling. The turret rotates on a horizontal axis and may contain a mechanism for temperature conditioning at one of its stations.

U.S. Pat. No. 4,370,124 to Buja discloses a modular rotary molding machine. The rotary style machine disclosed has a wheel which rotates about a horizontal axis. The entire wheel and additional assembly is mounted on a movable carriage with respect to a fixed injection unit. The diameter of the wheel is adjustable to vary the number of molds processed. Each mold thereon is filled individually and then clamped and packed by units positioned on board the wheel.

U.S. Pat. No. 4,243,362 to Rees discloses a composite molding apparatus for molding articles from two materials. The apparatus includes a four sided turret block rotatable between two opposed faces about a horizontal axis. The block is mounted slidably between a fixed and a moving platen of a horizontal injection molding machine. Two material molding is achieved by injecting different materials from separate injectors when the block is in each of two positions.

Additional turret style injection molding machines having a horizontal axis of rotation include U.S. Pat. No. 3,988,100 to Julien; U.S. Pat. No. 3,881,855 to Farkas; and U.S. Pat. No. 3,730,665 to Fortin.

The prior art also includes a plurality of two platen injection molding machines, some of which are discussed as follows.

U.S. Pat. No. 5,338,171 to Hayakawa discloses a die clamping apparatus with an aligning device. The apparatus includes a two platen clamp with alignment means provided by vertically adjustable trunnions under the movable platen. The trunnions are moved by cylinders which respond to deflection signals sensed at the ends of outriggers mounted to the moving platen.

U.S. Pat. No. 5,336,462 to Wohlrab discloses a mold closing apparatus for an injection molding machine. The machine includes a two platen clamp in which stroke cylinders are positioned inside tie bars, the ends of which also act as clamp pistons.

U.S. Pat. No. 5,314,327 to Stein discloses a mold clamp for an injection molding machine. The machine includes a two platen clamp with means to help align the mold halves. Adjustable rollers are used on a moving platen carriage and adjusting means are built into the carriage/moving platen assembly for improving alignment.

With respect to the prior art discussed above, no injection molding machines are disclosed having the objects and advantages discussed below and derived from the device disclosed herein. That is, each of the prior art devices discussed above has a relatively complex construction, requiring multiple mold platens and a greater number of moving parts. Accordingly, these devices inefficiently use excess floor space, exhibit greater energy consumption, and have relatively long cycle times.

There exists a need, therefore, for a two platen injection molding machine having a turret clamp with a plurality of movable platens, wherein the turret clamp is rotatable on a horizontal axis and longitudinally movable for placement into and out of engagement with another platen, thereby reducing floor space usage and energy consumption and increasing efficiency.

SUMMARY OF THE INVENTION

The primary object of this invention is to provide an energy and space efficient two platen injection molding machine having a reduced cycle time which includes a longitudinally movable and rotatable turret block.

Another object of this invention is to provide a two platen injection molding machine including a longitudinally movable and rotatable turret block, wherein combinations of pre-mold and post mold operations may be efficiently achieved on one machine using different stations of the turret block, thereby reducing cycle time.

Still another object of this invention is to provide a two platen injection molding machine having a longitudinally movable and rotatable turret block, wherein operations such as loading, injection, label loading, temperature conditioning, and direct unloading of molded parts can be achieved at different angular positions in a continuous and efficient manner using one machine having a plurality of stations, thereby reducing cycle time, floor space consumption, and energy consumption.

Yet another object of this invention is to provide an energy, cycle time and space efficient two platen injection molding machine having a rotatable turret block which includes a plurality of movable mold clamps for forming molds for the injection molding of a variety of parts.

And yet another object of this invention is to provide a two platen injection molding machine using a movable and rotatable turret block which includes a plurality of mold halves movable toward and away from a mating stationary mold half for forming molds for injection molding a variety of parts in an energy and cycle time efficient manner.

And another object of this invention is to provide a two platen injection molding machine including a rotatable turret block having a plurality of mold half sides and a plurality of stations to which the mold half sides are rotated for pre-molding and post molding operations.

A particular object of the present invention is to provide a two platen injection molding machine including a rotatable turret block having a plurality of mold half sides and a plurality of stations wherein one of the stations includes a blow molding station.

The foregoing objects and advantages are achieved by the present invention. The machine of the present invention includes: a first mold half having one of at least one mold cavity and at least one mold core; a rotatable turret means rotatable on an axis for rotating a plurality of movable mold halves thereof into alignment with said first mold half, each of said movable mold halves including one of at least one mold cavity and at least one mold core matable with said first mold half for forming a mold for molding a molded article, said rotatable turret means further for clamping said movable mold halves and said first mold half together; means for moving said rotatable turret means relative said first mold half; a first injection means for injecting melt into said at least one mold cavity; further including at least one means for performing at least one operation in addition to said molding, wherein said at least one means for performing comprises a blow molding station.

The details of the present invention are set out in the following description and drawings wherein like reference characters depict like elements.

BRIEF DESCRIPTION OF THE DRAWINGS

FIG. 2 is a partial elevational side view of an injection molding machine in an open position and in accordance with the principles of the present invention;

FIG. 3 is an end partially cross-sectional view taken along line 3—3 of FIG. 2;

FIG. 4 is an end view taken along line 4—4 of FIG. 1;

FIG. 5 is a side elevational and partially cross-sectional view from the side opposite of that shown in FIG. 2 with the injection molding machine in the partially open position;

FIG. 6 is an end elevational and detailed view taken along line 6—6 of FIG. 5;

FIG. 10A shows a more detailed embodiment of a schematically shown molded article removal station of FIG. 10;

FIG. 11A is an end view of the injection molding machine of FIG. 11 taken from line 11a—11a;

DETAILED DESCRIPTION OF THE PREFERRED EMBODIMENT

Figure 1:
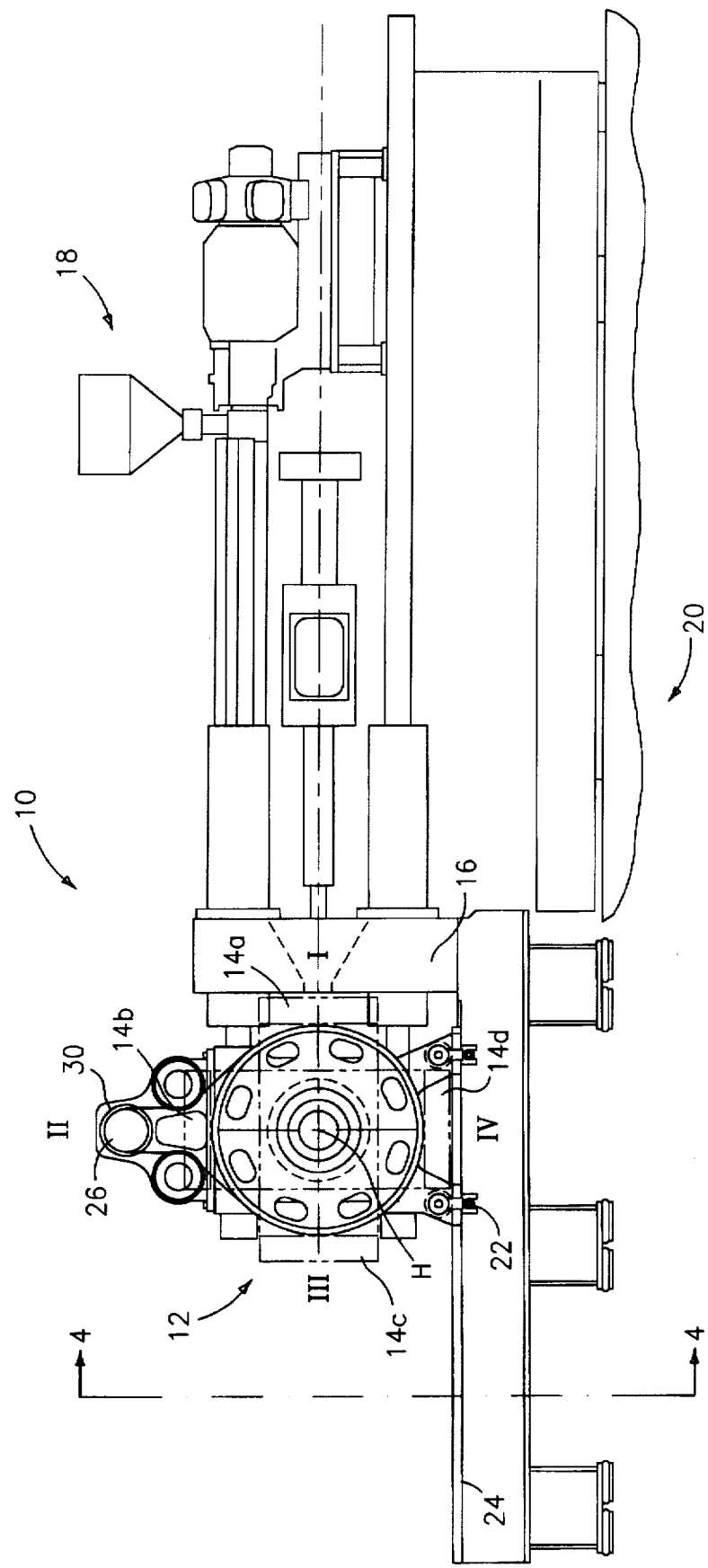
FIG. 1 is a side elevational schematic view of an injection molding machine in a closed position and in accordance with the principles of the present invention.

Referring now to the drawings in detail there is shown in FIG. 1 an elevational and schematic side view of the injection molding machine of the present invention, which is designated generally as 10. Injection molding machine 10 generally includes a rotatable turret block 12 with a plurality of movable mold halves 14a–14d, a stationary mold half and platen 16 and injection unit 18, all positioned on base 20.

Injection molding machine 10 may be used for molding a variety of different types of articles and accordingly, is not limited for use with any particular type of article. Preforms are referred to throughout this description by way of example only.

While the block is shown throughout this description as rotatable on a horizontal axis, and this is the preferred embodiment, it is feasible that a similar design of a movable turret block providing the clamping action may be provided which is rotatable on a vertical axis. Accordingly, this invention is not considered limited to the horizontal axis feature.

As shown in FIGS. 1–5, turret block 12 is preferably longitudinally movable on base 20 via a set of rollers 22 attached to the bottom of the turret block and thereby provides a mold clamp force. Base 20 includes hardened ways 24 which engage rollers 22, wherein rollers 22 engage the underside of ways 24 so as to counteract upward forces and tipping forces that may act on the turret block assembly. Turret block 12 is rotatable preferably by a motor, preferably an electric servo drive motor 26 and preferably on a horizonal axis H through arcuate sectors preferably of substantially 90°. Preferably, the electric servo drive motor is connected via a belt drive 30 to axis H for rotating turret block 12, as shown in FIG. 4, while the electric servo drive motor is preferably mounted on one of turret block carriages 32a and 32b extending from base 20.

As shown in FIG. 5, turret block 12 includes a plurality of movable mold halves, i.e. movable mold halves 14a–14d each of which includes a set of mold cores 34a–34d, respectively, each set having at least one mold core, adapted for engagement with a set of mold cavities 36, each set including at least one mold cavity and located in stationary mold half and platen 16. Preferably, four movable mold halves or faces 14a–14d are provided on turret block 12, although any number supportable by the size of the turret block 12 can be used. Sets of mold cores 34a–34d are adapted to be rotated into horizontal and vertical alignment with sets of mold cavities 36.

Referring still to FIG. 5, turret block 12 includes sets of ejector pistons or stripper rings 38a–38d, and a system for the operation thereof, which operate on sets of mold cores 34a–34d and strippers positioned on movable mold halves 14a–14d, respectively. Accordingly, sets of ejector pistons or stripper rings 38a–38d are positioned within turret block 12 and parallel to sets of mold cores 34a–34d and perform the function of stripping the mold cores of finished molded articles, for example, preforms, such as those shown in FIGS. 8–10. Each movable mold half and platen 14 includes at least one ejector piston in each set 38a–38d for stripping finished articles from sets of mold cores 34a–34d. For the detailed design of the ejector piston or stripper ring system for use with sets 38, reference is made to U.S. Pat. No. 5,383,780, issued Jun. 24, 1995, to the assignee of the present invention, for incorporation by reference of a design of the ejector piston or stripper ring system, particularly column 4, line 29, to column 7, line 6, and FIGS. 1–8. Preferably, the ejector piston or stripper ring system is actuated via the hydraulic services supplied to the turret block, as discussed below. The hydraulically actuated ejector piston or stripper ring system actuated by on board hydraulic services is the preferred design, however, other designs may be used.

Turret block 12 is movable backward and forward along hardened ways 24 on base 20 via piston/cylinder assemblies 40a–40d positioned in stationary mold half and platen 16, as shown in FIG. 5. Preferably four piston/cylinder assemblies 40a–40d, as shown in FIGS. 2, 3 and 5, are used which are positioned in the corners of stationary mold half or platen 16. Each piston/cylinder assembly 40a–40d includes a piston 42a–42d (42a, 42c and 42d not shown), which pistons 42a–42d are attached to tie bars 44a–44d, respectively, which tie bar acts as the piston shaft. Accordingly, tie bars 44a–44d extend from the piston/cylinder assemblies 40a–40d and are connected at an opposite end to turret block 12. In order to move turret block 12 backward and forward relative stationary mold half and platen 16, pressurized fluid is forced into cylinders 46a–46d against pistons 42a–42d, respectively. The side of pistons 42a–42d in which pressurized fluid is forced against, determines the direction in which turret block 12 moves relative stationary mold half and platen 16, that is, either into an open or closed position, shown in FIGS. 2 and 5, respectively. Tie bars 44a–44d pass through the turret block carriages 32a and 32b and are attached thereto via retaining nuts 48a–48d, as shown in FIG. 6, respectively.

Services S, shown schematically in FIG. 3 and 4, are provided to turret block 12 via a rotary union 50, also shown schematically. Accordingly, as turret block 12 rotates, services S are continuously supplied to the movable mold halves 14a–14d. Such services S include the supply of electricity, pressurized fluid, cooling fluids, and hydraulic fluids, etc. For using these services, turret block 12 also includes the required circuitry and control valves 51 (shown schematically) on board and movable and rotatable with the turret block.

Figure 7:
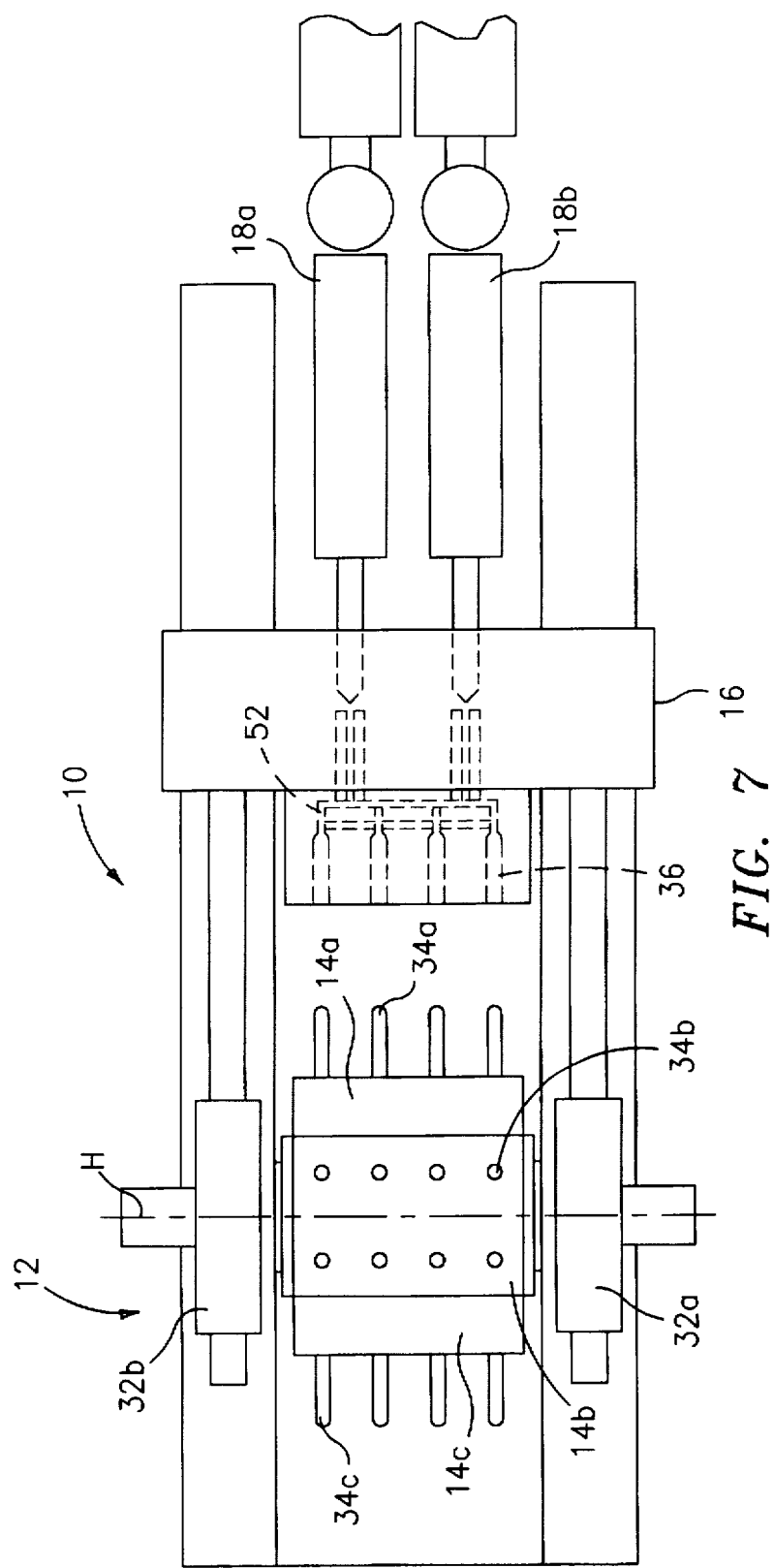
FIG. 7 is an overhead schematic view of the injection molding machine of the present invention similar to that shown in FIG. 1 showing an embodiment including a pair of injecting mechanisms.

Injection unit 18, preferably in the form of a reciprocating screw injection unit, is connected with stationary mold half and platen 16 positioned on base 20 for providing melt to the mold cores for molding. Injection unit 18 is preferably movable into and out of engagement with stationary mold half and platen 16 by means of carriage cylinders (not shown) on rollers and hardened ways, similar to as described above for use with turret block 12. In one embodiment, as shown in FIGS. 7, injection molding machine 10 of the present invention can provide co-injection of articles, for example, preforms. For this arrangement, two conventional reciprocating screw injection units 18a and 18b are used to feed two different kinds of resins into conventional mold cavities, such as those shown in stationary mold half and platen 16, which mold half and platen 16 includes a two material hot runner system 52 which delivers both resins into each mold cavity within stationary mold half and platen 16 for molding multi-layered articles, for example, preforms.

As discussed briefly above, injection molding machine 10 may include a plurality of stations, preferably stations I–IV, although more or less stations may be used, positioned adjacent the periphery of turret block 12, which stations I–IV are used for the performance of pre-molding or post-molding operations.

Figure 8:
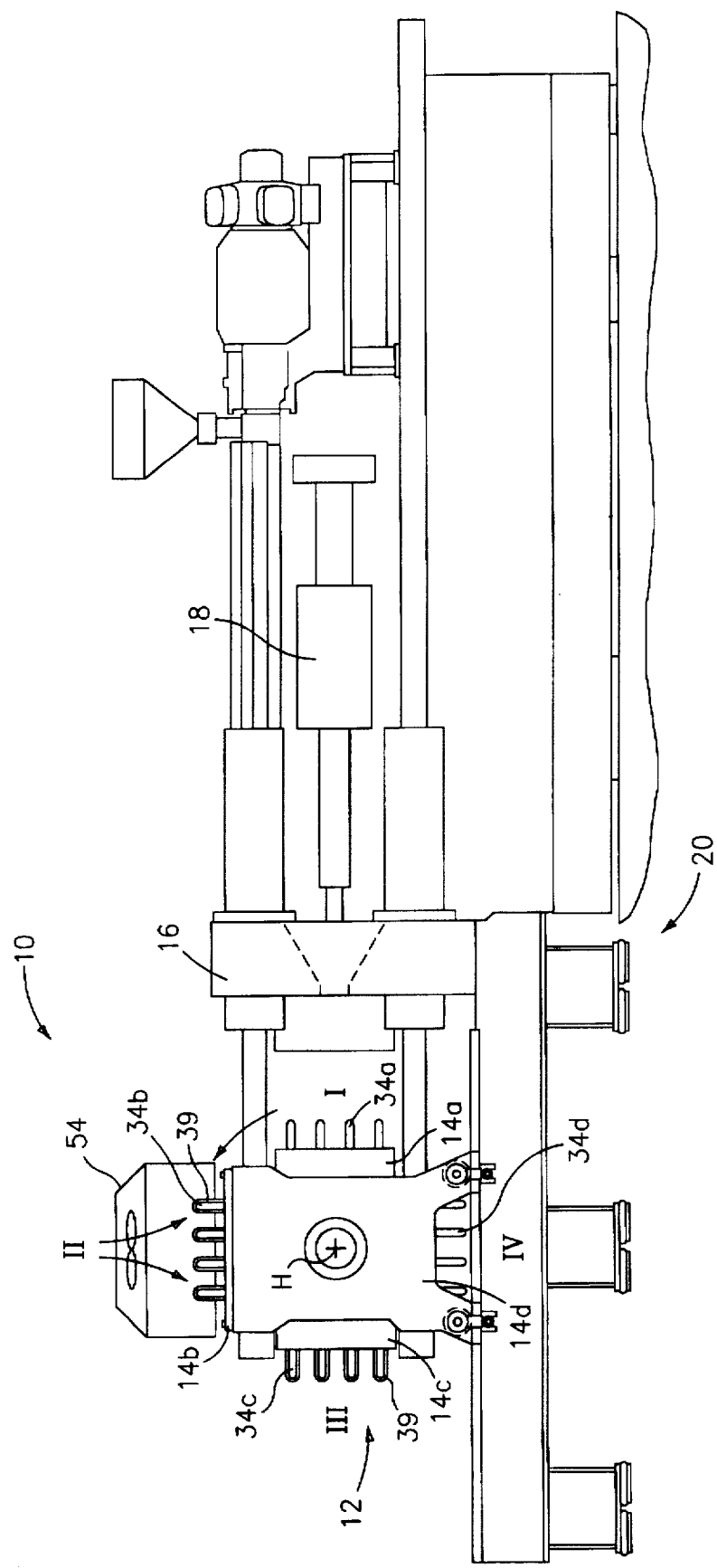
FIG. 8 is a side elevational schematic view of an injection molding machine of the present invention similar to that shown in FIG. 1, showing an embodiment thereof including a cooling station.

For example, and as shown in FIG. 8, an embodiment of injection molding machine 10 may include a temperature conditioning station 54, the design of which is not critical, preferably at station II, where temperature controlled air or other coolant is preferably directed onto newly molded articles to increase the rate of cooling thereof. If used with the co-injection case discussed above, the temperature conditioning station also enhances bond strength between the layers of the different resins used during co-injection. Based on the location of other stations, as discussed below, temperature conditioning station 54 may be located at one of the other stations, for example stations III and IV.

Figure 9:
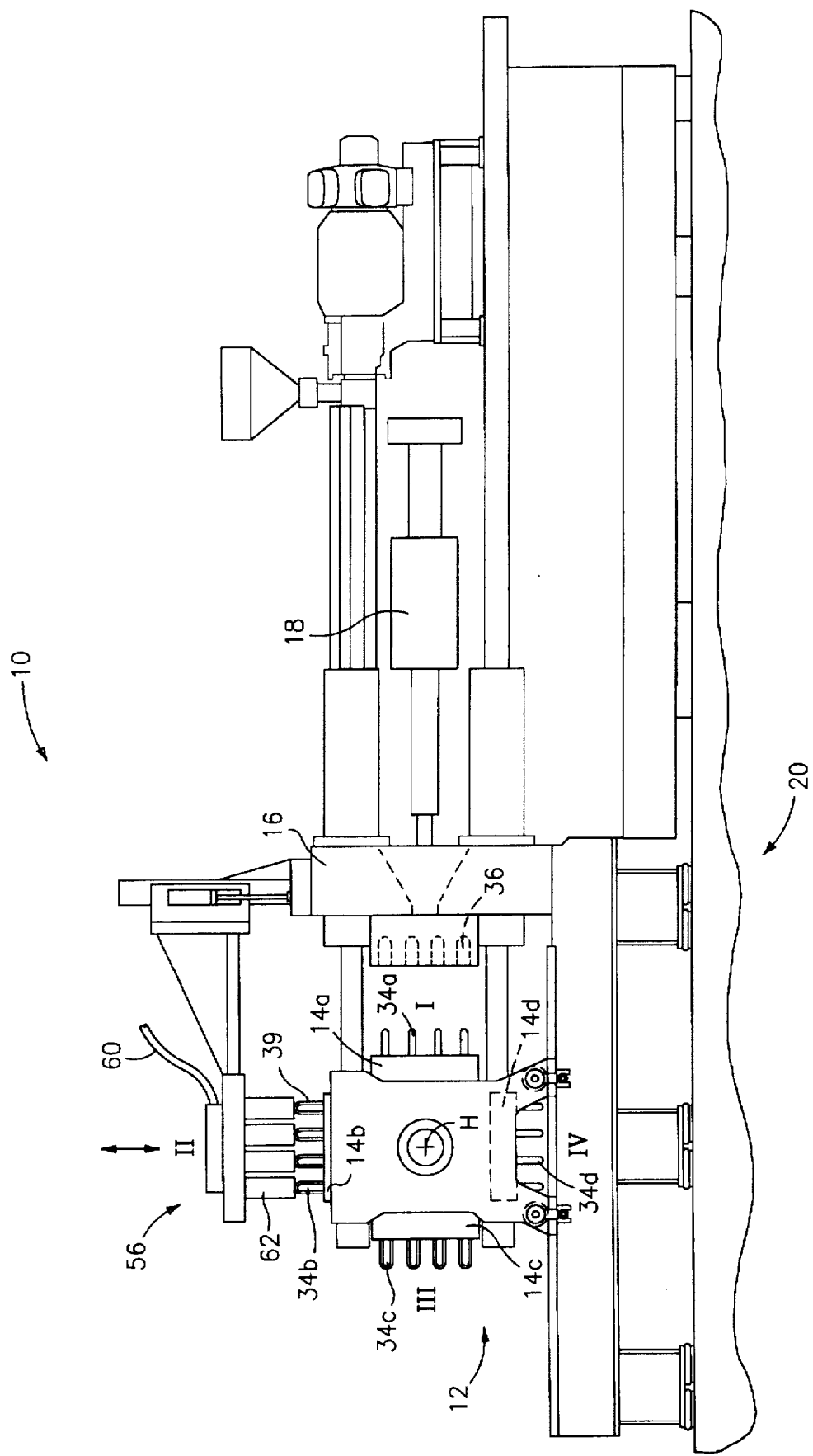
FIG. 9 is a side elevational and schematic view of an injection molding machine of the present invention similar to that shown in FIG. 1, showing an embodiment thereof including a label loading station.

In FIG. 9, another embodiment of injection molding machine 10 is shown wherein a label loading robot 56 is used to attach labels to the outside of molded articles after they have been rotated away from the molding station through an arcuate sector of 90° to a second station II. In label loading robot 56, labels are preferably conveyed inside a tube 60 to positioning areas 62 and retained at positioning areas 62 via the application of vacuum. Positioning areas 62 are positioned over at least one finished molded article while the molded article are positioned at the second station II. For applying the labels, the vacuum is preferably reversed to positive pressure and the labels are blown from positioning areas 62 into contact with preferably still hot but finished molded articles 39 for adhering the labels to the articles.

Figure 10:
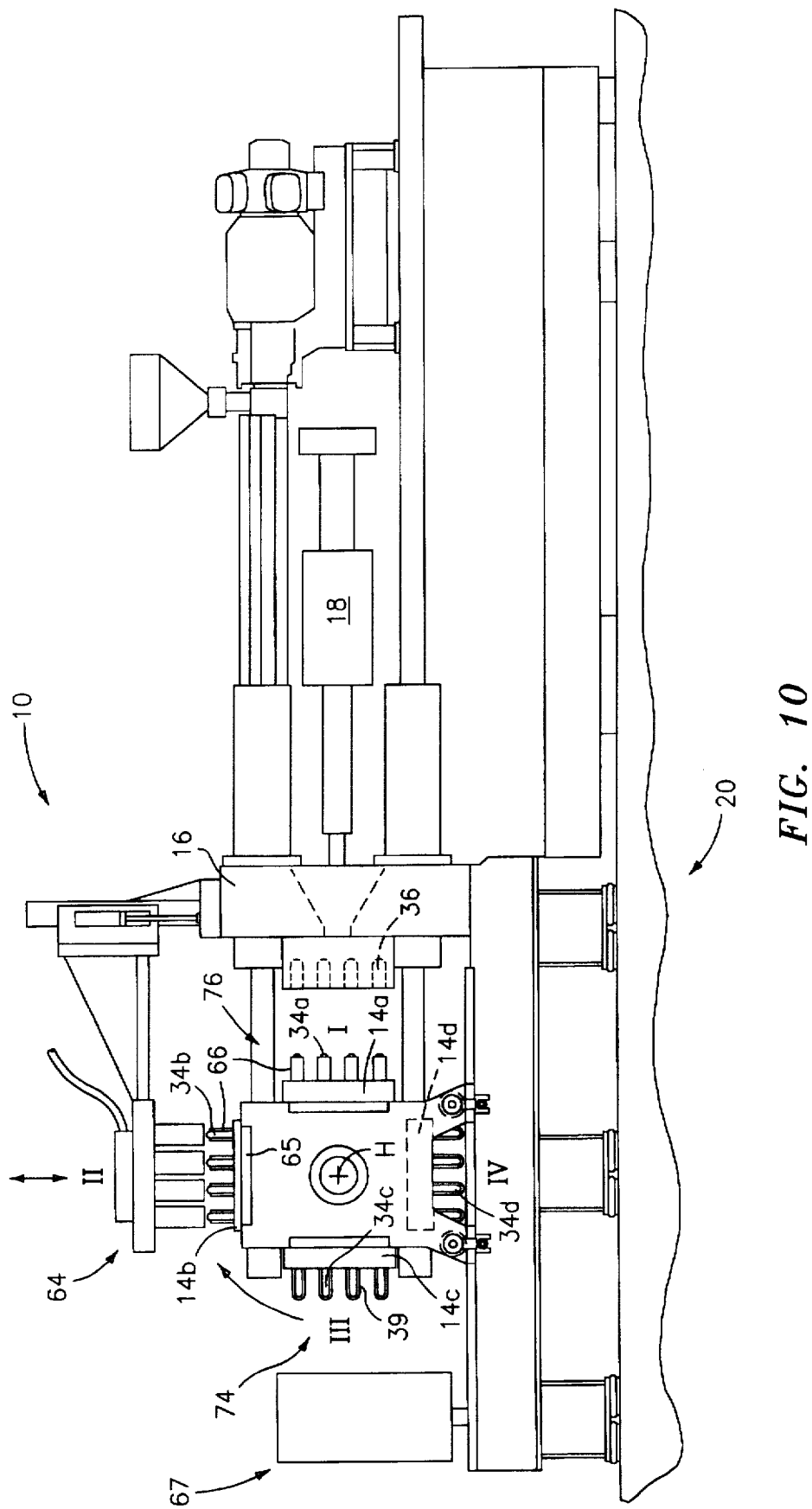
FIG. 10 is a side elevational and schematic view of an injection molding machine of the present invention similar to that shown in FIG. 1, showing an embodiment having an insert loading station and an article removal station.

In FIG. 10, still another embodiment of injection molding machine 10 of the present invention is shown where a robotic article liner loader 64, for example, a preform liner loader, is preferably positioned in at least one of stations I–IV, and preferably at station II, wherein liners 66 are loaded onto the mold cores of sets 34a–34d of each of movable mold halves 14a–14d, respectively, of turret block 12 and block 12 is preferably rotated clockwise. Accordingly, prior to being rotated into alignment, both vertically and horizontally, and longitudinally moved into engagement with stationary mold half and platen 16, one of sets of mold cores 34a–34d are loaded with the liners 66. Preferably, liners 66 are held on the mold cores of sets 34a–34d of movable mold halves 14a–14d, respectively, by vacuum source 65 (shown schematically) applied through the mold cores. Subsequently, turret block 12 is rotated so that mold cores of sets 34a–34d with liners 66 thereon are in alignment with set of mold cavities 36. Turret block 12 is then preferably moved to the closed position such that one of movable mold halves 14a–14d and stationary mold half and platen 16 are engaged. In this manner, resin may be injected by injection unit 18 over liners 66 for producing a two-layered molded article, for example, a two-layered preform.

In another embodiment, and also shown in FIG. 10, one of stations I–IV, preferably station III, may include a finished article removal mechanism 67 (shown schematically), which functions to remove finished molded articles 39 from the mold cores of sets 34a–34d of movable mold halves 14a–14d, respectively. As shown in FIG. 10, removal mechanism 67 is positioned at an article removal area 74 which is substantially unobstructed by molding area 76, defined between the movable mold halves of turret block 12 and mold half 16, unlike machines using turret blocks which are positioned between two mold halves. Accordingly, article removal area 74 is located outside of the article molding area 76 and the other stations, allowing for clear unobstructed access to finished molded articles for removal. This feature is particularly applicable to the removal of large molded articles or hard to handle molded articles, such as furniture and complex automotive parts. As a result, substantial space saving is achieved, wherein extra space does not have to be provided upon separation of the mold halves to accommodate the removal device. Similar to removal system 67, another advantage is that unobstructed access to finished molded parts is also provided for manual part removal.

In a preferred embodiment, article removal mechanism 67 is in the form of a robotic device (shown schematically as 67) automatically movable into and out of engagement with finished molded articles in area 74.

In another preferred embodiment, and which is applicable to the removal of molded closures from movable mold halves 14a–14d, an external unscrewing head (shown schematically as 67) may be used. The unscrewing head is preferably mounted on base 20 at station III in area 74 in which multiple chucks, preferably one per cavity, are used to unscrew molded closures from the mold cores of sets of mold cores 34a–34d. An unscrewing head for use herein is shown in U.S Pat. No. 3,328,844, issued Jul. 4, 1967, to the assignee of the present invention which is hereby incorporated by reference with particular attention to FIGS. 1–8, and column 3, line 25 to column 8, line 56.

And another preferred embodiment of the removal mechanism is shown in FIG. 10A, which depicts an enlarged detailed version of schematic removal mechanism shown in FIG. 10. This removal mechanism is preferably in the form of airveyors 69 positioned for alignment with mold cores, at station III. The airveyors include tubes 68 for applying vacuum to the finished molded articles 39. Airveyors 69 may be moved toward and away from turret block 12 via a movable platform 70 movable via a piston/cylinder assembly 72, which is preferably connected with platform 70. Accordingly, as the articles are continually cooled during rotation from station to station, finished articles are then removed via molded article removal mechanism 67.

Figure 11:
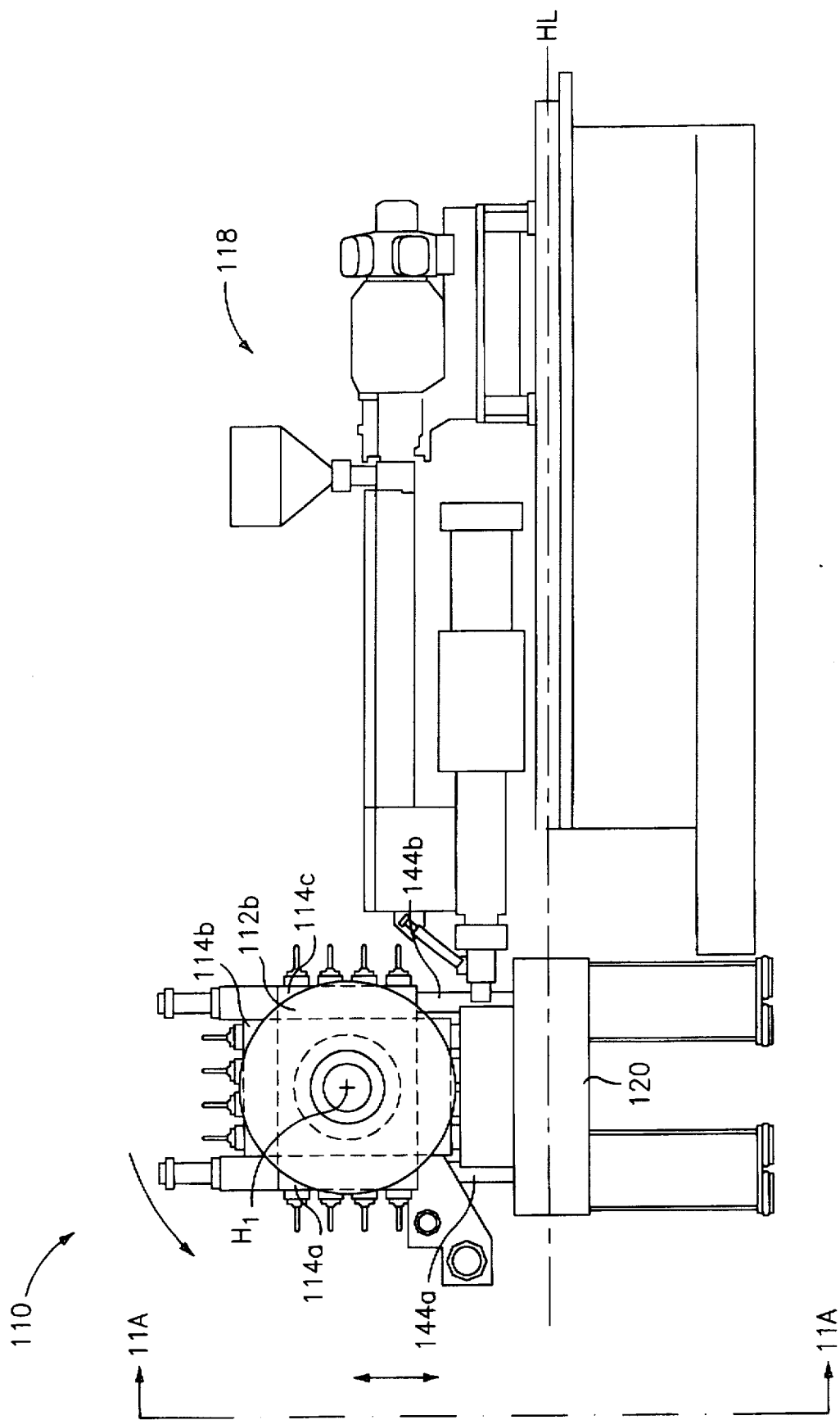
FIG. 11 is a side elevational and partially schematic view of another embodiment of an injection molding machine in accordance with the principles of the present invention.
Figure 11A:
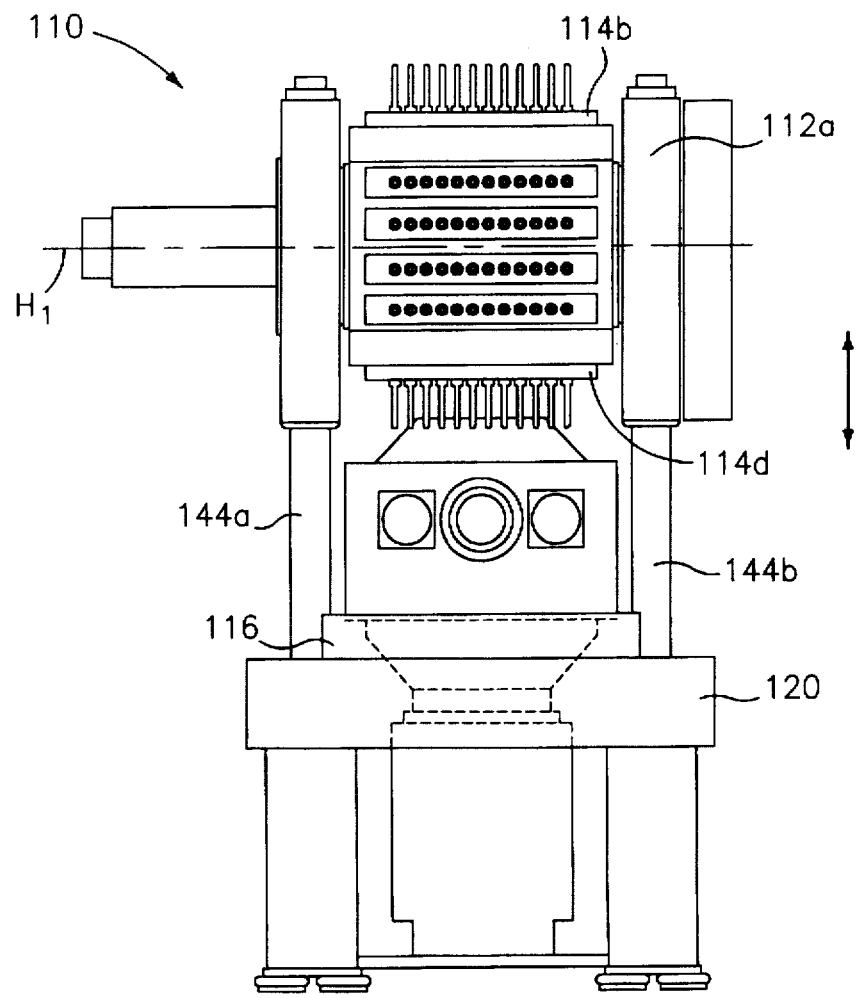
Figure 12:
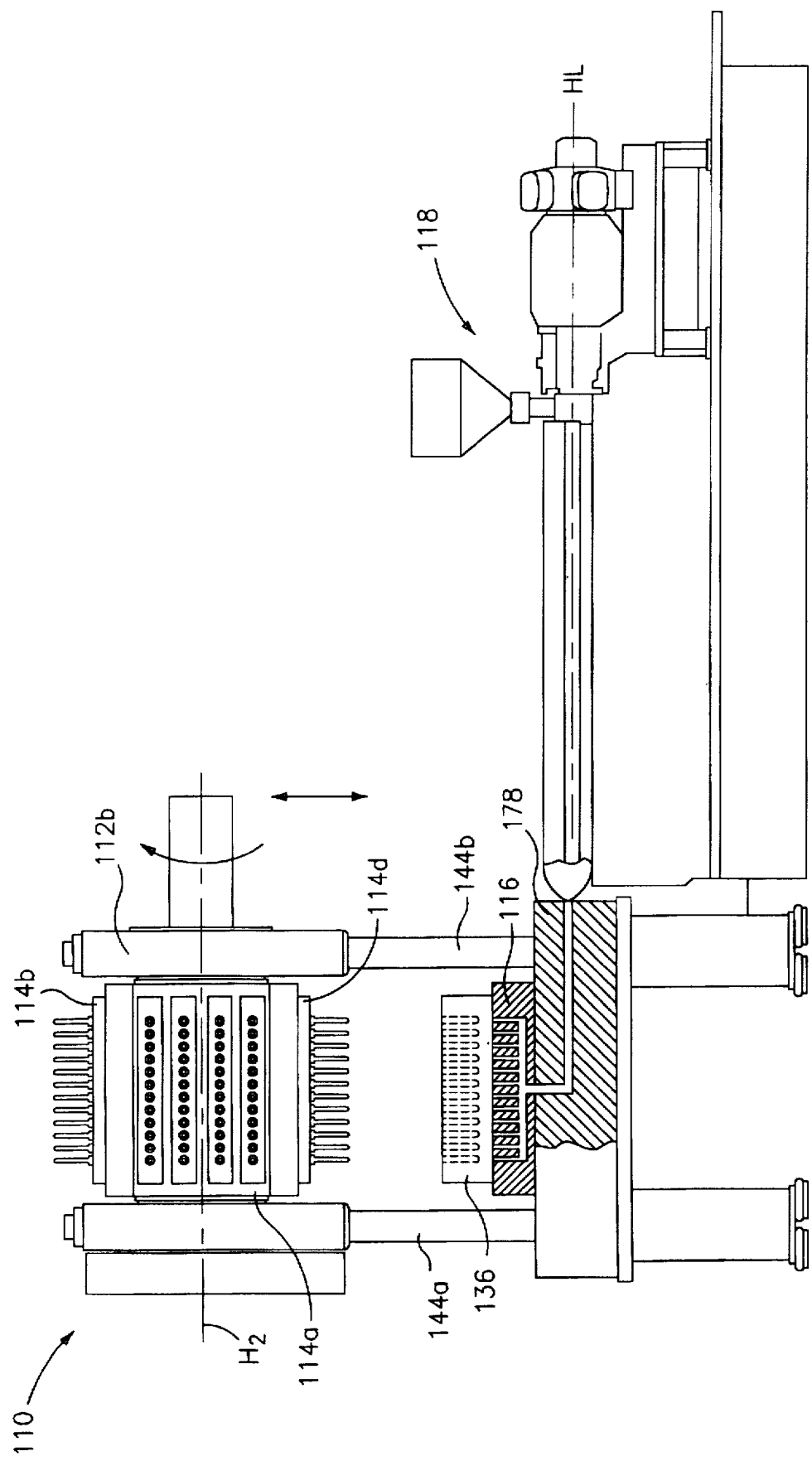
FIG. 12 is a side elevational and partially schematic view of another embodiment of an injection molding machine in accordance with the principles of the present invention, similar to that shown in FIG. 11.

Alternative embodiments 110 of the turret article molding machine are shown in FIGS. 11, 11A and 12, wherein addition space savings are acquired by arranging turret blocks 112a and 112b, of FIGS. 11, 11A and 12, respectively, and movable mold halves 114a–114d thereof, to be movable in a vertical plane relative stationary mold half 116. In FIGS. 11 and 11A, turret block 112a is rotatable on horizontal axis $H_1$ while in FIG. 12, turret block 112b is rotatable on horizontal axis $H_2$, wherein $H_1$ extends perpendicular to and $H_2$ extends parallel to the horizontal longitudinal axis HL of base 120. Blocks 112a and 112b are preferably rotatable after moving a complete stroke upward from base 120 and stationary mold half and platen 116.

In these embodiments, stationary mold half and platen 116 is supported on base 120 such that the face thereof lies in a horizontal plane parallel to axis HL. Injection unit 118 is arranged similar to unit 18 of FIG. 1, as shown, and is vertically positioned as required to inject melt into the mold cavities of set 136 of mold half and platen 116. For the embodiment shown in FIG. 12, the injection unit, instead of extending into the stationary mold as shown in FIG. 11 and 11A, extends into the bottom platen 178. Accordingly, additional space is provided for additional injection units for injecting multiple materials. The roller and track mechanism of block 12 is preferably eliminated in this embodiment and turret blocks 112a and 112b are vertically movable on vertically extending tie bars 144a–144d (144c and 144d not shown) relative stationary mold half and platen 116. The tie bars may include clamping mechanisms such as pistons and a mechanism is provided for moving blocks 112a and 112b under control to and from base 120. Stations I, II, III, and IV may include any of the mechanisms discussed above for turret block 12 for performing the operations discussed above.

In these embodiments, the operation performing mechanisms at the stations are supported at a higher vertical orientation and preferably receive this support off of base 120, although other separate support means may be used. The mechanisms located at stations I–IV may also be simultaneously vertically movable by known means to accommodate the vertical movement of blocks 112a and 112b, to maintain continuous performance of operations at the changing vertical positioning of blocks 112a and 112b.

The remaining features and alternative embodiments of machine 110 are essentially the same as discussed above for machine 10 and accordingly the above descriptions of these features apply equally to these embodiments. Any modifications which may apply for using these features with these embodiments are well within the skills of those in this art and accordingly are not described herein in detail.

However, for the embodiments of FIGS. 11, 11A and 12, finished molded articles may be directly unloaded onto elevated conveyors or other downstream equipment (not shown) with raised infeeds, if desired, thereby eliminating the need for additional article removal equipment.

In operation, one of mold halves 14a–14d and mold half and platen 16 are closed as shown in FIG. 1, aligning one set of mold cores 34a–34d, for example mold half and platen 14a with set 34a, with set of mold cavities 36. Resin is preferably injected through injection unit 18, or if two units are used for co-injection, units 18a and 18b, thereby filling the mold. The finished molded articles 39 are allowed to cool at least to the point where opening the mold will not deform the molded articles. Movable mold half and platen 14a, for example, and stationary mold half and platen 16 are then opened, as shown in FIGS. 2 and 5, whereby turret block 12 is preferably moved on rollers 22 over hardened ways 24 by piston/cylinder assemblies 40a–40d moving tie bars 44a–44d away from stationary mold half and platen 16.

Turret block 12 is then rotated 90° to present a fresh set of mold cores, for example set 34b of mold half and platen 14b into alignment and engagement with set of mold cavities 36. Since the molded articles shrink onto the cores they will continue cooling as turret block 12 rotates so that the mold can be open much sooner than with any conventional molding cycles. For example, while molded articles positioned on the set of mold cores 34a on movable mold half and platen 14a are moved from station I to each of stations II, III and IV, sets of mold cores 34b–34d of mold halves 14b–14d, are presented for engagement with the set of cavities 36 of stationary mold half and platen 16, and molded articles on movable mold half and platen 14a are subject to at least one post molding operation and in many times a plurality of post molding operations including cooling.

In addition, pre-molding operations, such as liner insertion, for preforming multi-layered articles such as preforms, can be accomplished prior to rotation of movable mold half and platen 14a, or any other mold half, back into alignment and engagement with stationary mold half and platen 16. Accordingly, at each of stations II, III and IV, post molding or pre-molding operations such as cooling and labeling and finished molded article removal, as shown in FIGS. 7, 9 and 10, respectively, and liner or insert loading as shown in FIG. 10, and discussed above, can be carried out.

For example, and more specifically, as a movable mold half moves to station II, temperature conditioning system 54 may be used to hasten cooling of molded articles, for example, preforms. Alternatively, at station II, as shown in FIG. 9, labels via label loading robot 56 may be applied to the finished molded articles, for example, preforms, in the manner discussed above. As shown in FIG. 10, finished preforms may be removed at station III from, for example, set of mold cores 34a of movable mold half and platen 14a via ejector pistons in set 38a, driven by the supplied hydraulic services, and article removal device 67, as discussed in detail above. Due to the unobstructed location of removal area 74 with respect to molding area 76, the article removal device, preferably a robot shown schematically as 67, is easily moved into position for removal. If closures or the like with inner threads or the like are being molded, an external unscrewing head may be positioned in removal area 74 for facilitating removal of the closures, as discussed in the incorporated reference.

FIG. 10 also shows an opposite direction of rotation of turret block 12. In this embodiment, and maintaining the same frame of reference as discussed above, finished molded articles are moved from station I to stations IV–II, in that order for forming multilayered molded articles, for example, preforms, via an overmolded liner. For illustration purposes, movable mold half and platen 14d is discussed as moving through each of stations I–IV, although movable mold halves 14c–14d and their respective mold cores are actually shown at stations I–III.

Accordingly, finished molded articles, such as preforms, are molded on the mold cores of set 34d of movable half 14d and first moved to station IV whereat they are preliminarily cooled while a new set of molded articles, for example, preforms, are molded on movable mold half and platen 14a. Upon a completed rotation, while finished molded articles are being held via vacuum 65 on set of cores 34a on movable mold half and platen 14a at station IV, movable mold half and platen 14d is preferably moved to station III where set of ejector pistons 38d, part of a system actuated via hydraulic services S, and article removal device 67 are used to remove the finished molded articles 39, such as preforms, from the mold cores of set of mold cores 34a.

Mold half and platen 14d is rotated to station III and finished molded articles 39, such as preforms, from set of mold cores 34a on movable mold half and platen 14a are removed via device 67. At station II, liners 66 are loaded onto set of mold cores 34d of movable mold half and platen 14d for overmolding to form a multi-layer molded article, such as a multilayered preform, at station I. At the same time, movable mold half and platen 14c is moved into alignment with stationary mold half and platen 16, turret block 12 is moved longitudinally toward stationary mold half and platen 16, and a molding operation is preferably performed wherein an outer layer is overmolded over insert liners 66 to form another set of multi-layered articles, such as preforms. Finally, movable mold half and platen 14d with liners 66 on set of mold cores 34d is rotated for engagement with mold half and platen 16 and set of mold cavities 36.

With regard to the embodiments shown in FIGS. 11, 11A and 12, substantially the same mode of operation as discussed above is performed for system 110 and blocks 112a and 112b, including, for example, rotation, operations performance, and sequence. However, blocks 112a and 112b with mold halves 114a–114d are moved into position with mold half and platen 116 in the vertical direction on tie bars 144a–144d and the operations are performed at an elevated level. In these embodiments, significant floor space reduction is attained, as the machines, due to the vertical arrangements, instead consume above the floor air space, allowing for the use of more machines in less floor space. Other variations in operation are obvious from the description set forth above.

If, in any of the operations discussed above, a molded article formed from more than one material is desired, the plurality of injection units 18a and 18b may be used along with the two material hot runner system 52, as discussed above, for molding articles formed from more than one material.

Any combination of the post-molding and premolding operations can be performed at the plurality of stations I–IV, wherein the embodiments given above are by way of example only. While it is shown and preferred that the mold cores be located with the turret block, it may also be possible to switch the positioning of the mold cores and cavities among the turret block and stationary platen if a movable injection unit is used. Resin, therefore, would be supplied to the mold cavities through services S.

Figures 13, 14:
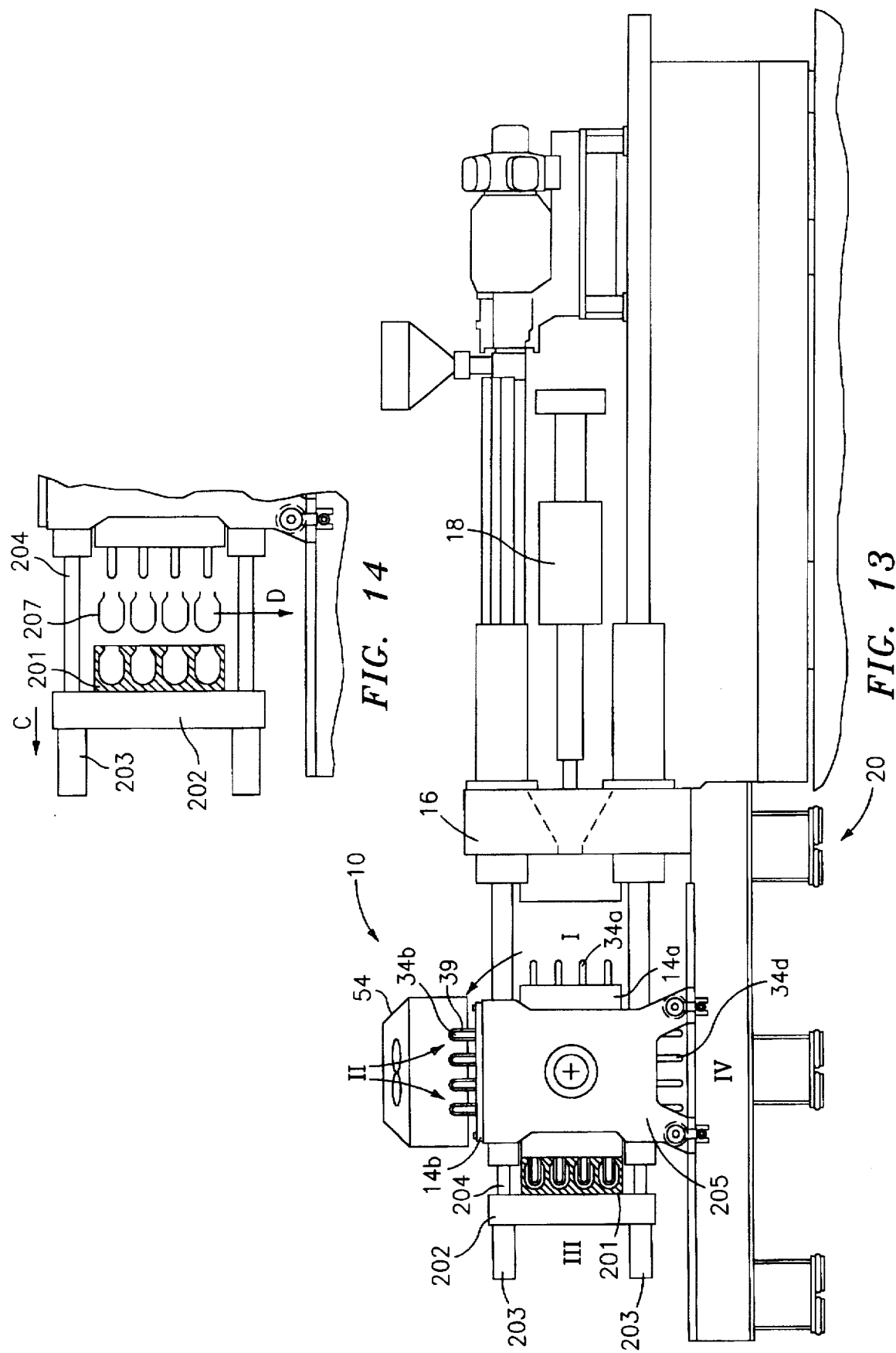
FIG. 13 is a side elevational and partly schematic view of an embodiment of the present invention including a blow molding station.
FIG. 14 is a detailed side view of the blow molding station of FIG. 13 in the open position.

Referring to the embodiment of FIG. 13, at station III is a multicavity blow mold 201 having one blow mold cavity for each preform on the turret face. The multicavity blow mold 201 is mounted on platen 202 which is reciprocated from a blowing position shown in FIG. 13 to an ejection position shown in FIG. 14 by cylinders 203 mounted on platen 202 and whose rods 204 project through the platen and are fixed to turret carriage 205. Thus, when the carriage 205 moves towards and away from stationary platen 16, the multicavity blow mold 201 travels with it in either the blowing or ejection positions.

In operation, the blow mold can be closed for blowing when the injection mold is closed for injection molding at station I as shown in FIG. 1. Alternatively, the blow mold can be positioned in the closed position as shown in FIG. 13 and the blowing operation performed whenever the turret is not rotating since the multicavity blow mold 201 travels with rotary carriage 205. Then to permit rotation of the turret the blow mold is in the ejection position usually when the injection mold is in the open position as shown in FIG. 8. Blown articles may be stripped from the cores by the opening action of the blow mold, arrow C in FIG. 14, and ejected from the blow cavities of multicavity blow mold 201 when they split sideways into the open position. This splitting action is well known and is not shown in the drawings. The blow articles 207 then fall, as indicated by arrow D in FIG. 14, onto a conveyor (not shown) under the base of the machine. The compressed air supply for blowing may be provided through the cores via services entering the turret block as previously described.

Figure 15:
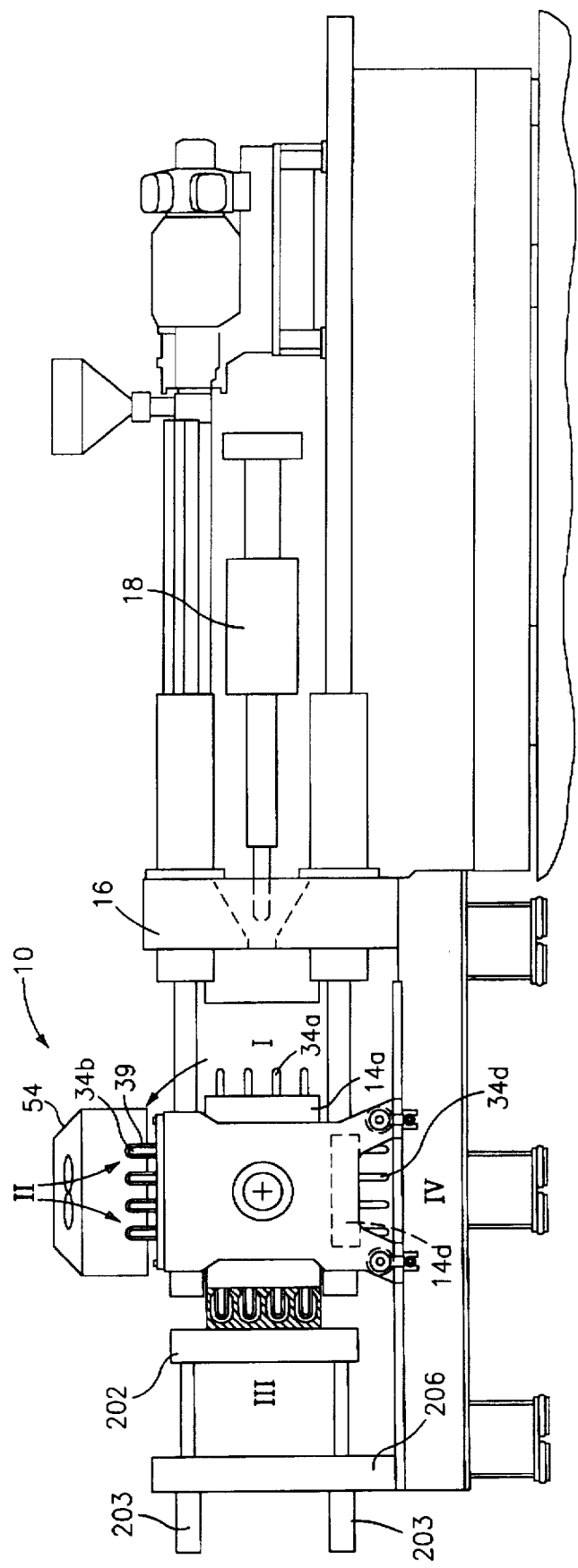
FIG. 15 is a side elevational view similar to FIG. 13 showing an alternate embodiment.

FIG. 15 shows an alternative embodiment with blow mold cylinders 203 mounted to a fixed block 206, which is affixed to the machine base. Thus, platen 202 is reciprocated conventionally by the cylinders from fixed block 206 to operate as described above.

A particular advantage of this embodiment is that the construction materials used for the blowing unit and blow mold can be lower in cost because the clamping of the blow mold is performed independently of the clamping of the injection mold. The blow clamp force is typically one third or less (for example 100 tons versus 300 tons) than the injection clamp force. Consequently, the blow molds can be made of much less expensive material, as aluminum, etc., than that which is commonly used, and the blow clamp itself can be less costly.

Figure 16:
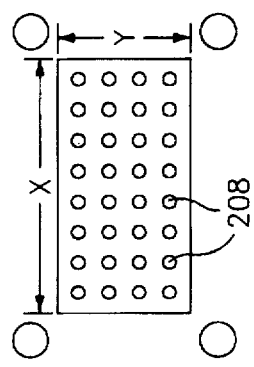
FIG. 16 is a schematic view of a preform mold core layout suitable for use in the present invention.

An additional advantage is that the platen area available for blow cavities is much larger than previously available. For example, FIG. 16 shows a representative preform mold-core layout using 24 cores 208 in the area X by Y. The blow cavities would have the same pitch as the preforms and consequently this compact 4 by 6 core layout can be used to optimize the available platen area. Other layouts may of course also be used and the 24 cavity layout is shown by way of example only, for example, one could readily use a 48 cavity layout. Thus, the present invention provides a very compact and efficient layout suitable for use with a large number of cores, for example, 48 cores, to maximize the utilization of the space available without penalizing cost or cycle time.

In accordance with the injection molding machines disclosed in detail above, molding cycle time is significantly reduced by comparison to conventional injection molding machines, described above. That is, molded articles may be cooled on the mold cores while other articles are being molded instead of immediately removed after a hold time via ejector. As a result, the mold halves may be separated prior to the completion of cooling since the molded articles, such as preforms, remain on the cores and do not warp or deform since they do not immediately require the integral strength to survive an ejection/stripping action. Accordingly, hold time is substantially eliminated with regard to the molding cycle, reducing the molding cycle by substantially half.

The primary advantage of this invention is that an energy and space efficient two platen injection molding machine having a reduced cycle time is provided which includes a longitudinally movable and rotatable turret block. Another advantage of this invention is that a two platen injection molding machine is provided including a longitudinally movable and rotatable turret block, wherein combinations of pre-mold and post mold operations may be efficiently achieved on one machine using different stations of the turret block, thereby reducing cycle time. Still another advantage of this invention is that a two platen injection molding machine is provided having a longitudinally movable and rotatable turret block, wherein operations such as insert loading, injection, label loading, temperature conditioning, and direct unloading of molded articles can be achieved at different angular positions in a continuous and efficient manner using one machine having a plurality of stations, thereby reducing cycle time, floor space consumption, and energy consumption. Yet another advantage of this invention is that an energy, cycle time and space efficient two platen injection molding machine is provided having a rotatable turret block which includes a plurality of movable mold clamps for forming molds for the injection molding of articles. And yet another advantage of this invention is that a two platen injection molding machine is provided using a movable and rotatable turret block which turret block includes a plurality of mold halves movable toward and away from a mating stationary mold half for forming molds for injection molding articles in an energy and cycle time efficient manner. And another advantage of this invention is that a two platen injection molding machine is provided including a rotatable turret having a plurality of mold half sides and a plurality of stations to which the mold half sides are rotated for pre-molding and post molding operations.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection molding machine comprising:
   a first mold half having one of at least one mold cavity and at least one mold core;
   a rotatable turret means rotatable on an axis for rotating a plurality of movable mold halves thereof into alignment with said first mold half, each of said movable mold halves including one of at least one mold cavity and at least one mold core matable with said first mold half for forming a mold for molding a molded article, said rotatable turret means further clamping said movable mold halves and said first mold half together;
   means for moving said rotatable turret means relative said first mold half;

a first injection means for injecting melt into said at least one mold cavity; and further including at least one means for performing at least one operation in addition to said molding, wherein said at least one means for performing comprises a blow molding station.

2. The injection molding machine according to claim 1, including a blow mold positioned adjacent each of said mold cores.

3. The injection molding machine according to claim 2, wherein said blow molding station includes a multicavity blow mold with blow mold cavity for each mold core.

4. The injection molding machine according to claim 3, wherein the multicavity blow mold is mounted on a platen which is reciprocated from a blowing position to an ejection position.

5. The injection molding machine according to claim 4, including means for moving said platen with the movement of said rotatable turret means relative to said first mold half.

6. The injection molding machine according to claim 4, wherein the platen is reciprocated by cylinders mounted on said platen.

7. The injection molding machine according to claim 4, wherein the platen is reciprocated by cylinders mounted on a fixed block.

* * * * *